June 2, 1964   J. F. RUFFER   3,135,642
STRIP JOINING SYSTEM FOR PRESSURE SENSITIVE ADHESIVE TAPE
Filed Jan. 3, 1961
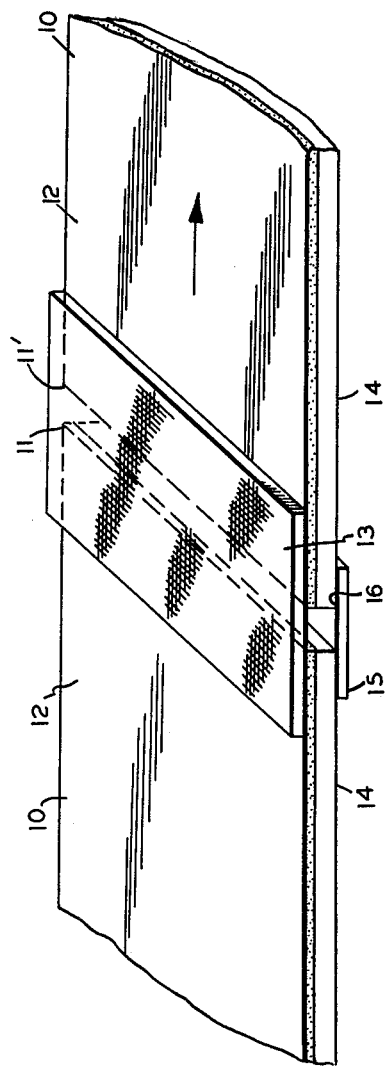
INVENTOR.
JAMES F. RUFFER
BY *Hugh E. Smith*
ATTORNEY

United States Patent Office 3,135,642
Patented June 2, 1964

3,135,642
STRIP JOINING SYSTEM FOR PRESSURE
SENSITIVE ADHESIVE TAPE
James F. Ruffer, Cohoes, N.Y., assignor to Norton
Company, Troy, N.Y., a corporation of Massachusetts
Filed Jan. 3, 1961, Ser. No. 80,253
2 Claims. (Cl. 161—36)

The present invention relates in general to pressure sensitive adhesive tapes and more particularly to an improved splice for joining ends of such tapes together during manufacture thereof and to rolls of tapes containing such improved splices.

Practically all pressure sensitive adhesive tapes are manufactured in the form of a wide web which is coated with the various component coatings such as primers, backsizes and mass coats, wound upon itself to form a large jumbo roll, and then slit to desired commercial widths and wound into shorter length rolls. During the manufacturing operation, sections of the wide webs are found to be sub-standard due to imperfections in the backing material or the coatings applied thereto. These sections must be cut out so that the finished roll of tape is substantially uniform and of good quality. When each imperfect section is cut it becomes necessary to join the cut ends of the remaining tape together. The types of splices utilized in such joining operation vary somewhat depending upon the tape, but generally are either a butt or overlap splice. In the butt splice, the two cut ends are placed adjacent one another and a strip of double-face tape is placed on the tapes over the adhesive coated surfaces and extending across the width of the tape. This type of splice has proven impractical since frequently the splice permits the cut ends of the tape to pull apart slightly and adhesive from the following layer of tape in the roll flows into the crevice causing delamination of the tape upon unwinding. In the overlap splice one of the cut ends slightly overlaps the other cut end and a strip of double-face (adhesive-coated on both sides) tape is placed across the underside of the junction line of the cut ends. This type of splice is too thick where the tape is to be subjected to subsequent converting operations—causing the printing machine head to jump resulting in heavy printing until the machine is readjusted. Also, this type of splice does not cause delamination while the tape is being unwound at the printer but does reverse itself for the end user of the tape. This results in delamination when the tape is finally used.

Accordingly, it is an object of the present invention to provide an improved splice for joining two ends of pressure sensitive adhesive tape together.

It is a further object of the invention to provide a strip of pressure sensitive adhesive tape containing a splice which overcomes the defects described above.

Another object of the invention is to provide a roll of pressure sensitive adhesive tape which contains at least one splice and which will not delaminate at such splice upon rewinding and subsequent unwind.

Additional objects, if not specifically set forth herein, will be readily apparent to one skilled in the art from the following detailed description of the invention.

In the drawing:

The figure illustrates the improved splice of the present invention applied to a strip of pressure sensitive adhesive tape.

Generally, the present invention resides in an improved butt splice wherein the joint between the cut ends of the tape strip are covered by a woven glass tape coated with adhesive on both sides and placed transverse to the length direction of such tape strip. The opposite side of the joint (the non-adhesive side of the tape strip) is covered with a thin film-backed pressure sensitive tape—coated on one side only—and again applied transverse to the length direction of the spliced tape strip.

Referring now to the drawing, the figure illustrates the splice of the present invention wherein the cut portions of tape strip 10 are joined by bringing the cut ends 11—11' into abutting contact with each other; overlying the adhesive surface 12 thereof with a woven glass strip 13 coated on at least the top surface thereof and preferably on both surfaces with pressure sensitive adhesive, said woven strip covering the abutting ends 11—11' and extending for a short distance onto the surface 12 of each section of tape 10; and then applying on the opposite surface 14 of said tape 10, a thin film-backed pressure sensitive adhesive tape 15—having adhesive 16 only on the side contacting tape 10, said film-backed tape running transverse to the length direction of tape 10 and overlying the line of contact between abutting ends 11—11' of tape 10. This splice will hold under all conditions encountered in subsequent converting operations such as printing or the like; furnishes a smooth, easy running joint; and will not delaminate.

The glass cloth tape used in this splice is preferably a thin (around 2 mil thickness) normal square weave cloth of 60 warp ends and 47 fill ends per inch, weighing approximately 1.43 oz./yd.$^2$ and having tensile strengths of 70#/in. in the warp and 40#/in. in the fill directions, but obviously other woven tapes could be used—varying both as to count and as to composition of the warp and fill threads. Synthetic fibers which are relatively strength resistant may be substituted for the glass filaments if desired. The adhesive used should be the same as or at least approximate the adhesive used on the tape being spliced and may be applied to one or preferably both faces of the glass cloth. The use of a woven reinforcement permits a thinner structure since the reinforcement will embed itself upon the application of pressure into the adhesive surfaces of the strips being spliced.

The film-backed tape is preferably thin and transparent in order to keep down the thickness of the splice and to permit the tape backing to appear uniform. Transparency is of particular importance where the tapes being spliced are colored. Cellophane (regenerated cellulose), vinyl, cellulose acetate or any of the conventional films known to the art may be used as the film backing material. The film should be backsized or otherwise treated so as not to adhere to the adhesive on the following layer of tape when the spliced tape is wound upon itself in roll form. A preferred backing is a 1.4 mil regenerated cellulose film.

Obviously, any of the known pressure sensitive adhesive coatings, backsize and primer compositions may be used in forming the component parts of the splice of the present invention and the invention is not considered limited as to any of these specific coatings. Generally, however, the adhesive will be of the well-known rubber resin type both on the tape being spliced and on the film and glass cloth tapes used in forming the splice.

While useful primarily in joining the ends of tapes made on paper backings, obviously the splice of the present invention may be used in connection with the joining of cloth or other fibrous backed tapes as well as in splicing non-fibrous film-backed tapes.

I claim:

1. A joint for connecting two pieces of pressure sensitive tape together comprising:
    (A) a pair of pressure sensitive tape sections,
    (B) each having a backing member, a layer of pressure sensitive adhesive thereon, and a free end,
    (C) said free ends of said tape sections abutting one another with the pressure sensitive adhesive layer on one section substantially parallel to the pressure sensitive adhesive layer on the other section;

(D) a flexible woven reinforcement disposed over said abutting ends and extending transversely across said tape sections,
(E) said woven reinforcement being embedded in said pressure sensitive adhesive layers; and
(F) a non-fibrous film-backed strip bearing on one surface only thereof a layer of pressure sensitive tape,
(G) said strip being disposed over said abutting ends on the surfaces of said tape sections opposite said woven reinforcement, and being
(H) held to said surfaces by said layer of pressure sensitive adhesive on said strip.

2. A tape as in claim 1 wherein said woven reinforcement is a glass cloth.

References Cited in the file of this patent

UNITED STATES PATENTS

| | | |
|---|---|---|
| 298,095 | Kleinert | May 6, 1884 |
| 1,383,726 | Kiracofe | July 5, 1921 |
| 2,313,990 | Crandell | Mar. 16, 1943 |
| 2,726,222 | Palmquist et al. | Dec. 6, 1955 |
| 2,745,464 | Auerbacher et al. | May 15, 1956 |
| 2,896,271 | Kloote et al. | July 28, 1959 |
| 2,940,884 | White | June 14, 1960 |
| 2,993,823 | Wilson | July 25, 1961 |